United States Patent [19]

Fino et al.

[11] Patent Number: 4,598,406
[45] Date of Patent: Jul. 1, 1986

[54] PRESSURE-WAVE CYCLED, REPETITIVELY PULSED GAS LASER

[75] Inventors: Jeffrey J. Fino, Melville, N.Y.; George E. Faulkner, Dallas, Tex.

[73] Assignee: Texas Instruments Incorporated, Dallas, Tex.

[21] Appl. No.: 692,453

[22] Filed: Jan. 18, 1985

[51] Int. Cl.⁴ .............................................. H01S 3/22
[52] U.S. Cl. ........................................ 372/59; 372/92; 372/89; 372/90; 372/84
[58] Field of Search .................... 372/59, 58, 55, 69, 372/81, 84, 92, 83, 90, 89

[56] References Cited

U.S. PATENT DOCUMENTS 3,898,584  8/1975  Born ........................................ 372/90
4,360,922  11/1982  Kulkarny .............................. 372/59

OTHER PUBLICATIONS

Srivastava et al; "Acoustic Suppression in a Pulsed Laser System" AIAA Jour. vol. 18, No. 5, May 1980.
Srivastava; "Pressure Wave Attenuation Due to Anode Mufflers in Pulsed Lasers"; AIAA Jour. vol. 21, No. 3, Mar. 1983.
Ausherman et al; "Acoustic Suppession in a Pulsed Chemical Laser"; AIAA Jour. vol. 17, No. 5, May 1979.

Primary Examiner—Léon Scott, Jr.
Attorney, Agent, or Firm—Alva H. Bandy; Leo N. Heiting; Melvin Sharp

[57] ABSTRACT

A pressure-wave cycled, repetitively pulsed gas laser comprises a laser cavity having open first and second ends, a channel connecting the first and second sides of laser cavity and a lasing initiation mechanism including two electric discharge electrodes. The electrode discharge generates a shockwave and associated pressure ridge. The channel may be a conicoidical channel of which the first and second open sides of the laser cavity form, respectively, large and small entrances for the shock wave and pressure ridge whereby when the wavefronts meet in the channel the energy thereof cancels in proportion to the entry areas and the resultant wave proceeds to the small entrance where it is accelerated by the nozzle action of the small entrance, entrains non-disassociated gases and circulates the gases through the laser cavity. In a second embodiment the channel circumscribes the open sided laser cavity and includes a reflector at the upstream side and a disperser at the downstream side whereby the shock wave and pressure ridge of the laser cavity is reflected through the laser cavity to the disperser which sends the wave through the channel thereby preventing it from reentering the laser cavity at the downstream end. A third embodiment utilizes an asymmetrical chamber with sides which reflect the pressure wave in a circular manner about the center of the discharge region, thus eliminating the channel.

9 Claims, 3 Drawing Figures

PRESSURE-WAVE CYCLED, REPETITIVELY PULSED GAS LASER

This invention relates to gas lasers and more particularly to repetitively pulsed gas lasers of the type having a gas lasing medium circulated through a loop.

Transversely Excited Atmospheric (TEA) pulsed lasers have an inherent problem in that each time the laser is discharged the gas between the electrodes is ionized and a small percentage is disassociated to form subspecies. Rapid sequential pulsing causes a buildup of the subspecies in the discharge area, which ultimately results in discharge instability and lasing failure. Also, the ionized gas has a recombination time which limits the maximum discharge repetition rate. If the laser is discharged prior to recombination of the ionized gas, laser failure results.

In prior art lasers, mechanical shutters are positioned upstream and downstream of the lasing cavity, and are manipulated in sequence to utilize the pressure waves resulting from residual energy in the cavity gas to control gas flow. Pressure waves which would produce density gradients are isolated from the cavity by the shutters, thereby reducing problems associated with gas inhomogenieties during the lasing event. The shutters are operated in a static medium between pressure pulses, and thus themselves produce no additional disturbances. Those persons skilled in the art desiring more information on this prior art are referred to U.S. Pat. No. 4,360,922, issued Nov. 23, 1982 for a "Pressure Wave Charged Repetitively Pulsed Laser". Increasing the sequential discharge rate beyond the recombination time has been accomplished through the use of high velocity fans and blowers to force the ionized molecules and subspeices from the discharge region, simultaneously replacing the gas in the discharge region with fresh gas from a reservoir.

It has also been suggested that pressure waves resulting from residual thermal energy in the laser cavity may be employed for stimulating gas circulation by disposition of a gas valve upstream of the laser cavity and an acoustic resonator downstream of the lasing cavity. The gas valve is to be manipulated as a function of shock wave travel within the resonator for drawing fresh gas through the valve into the discharge cavity. This technique is discussed in greater detail by Gubarev et al in an article entitled "Possibility of Spontaneous Circulation of a Gas Mixture in a Pulse-periodic Laser," Sov. J. Quan. Elec. July 1978, pages 912-913.

The problems with the prior art devices are those attending the use of mechanically operated valves and valves controlled by electronic circuitry, fans and blowers, e.g., mechanical and electrical failures, and increased weight, size, cost and complexity of the laser system.

Accordingly it is an object of this invention to provide an improved pressure-wave charged, repetitively pulsed gas laser.

Another object of the invention is to provide an acoustically pumped circulator for a pulsed gas laser.

A further object of the invention is to provide a valveless circulator for a pulsed gas laser.

Still another object of the invention is to provide a repetitively pulsed gas laser which is light, capable of high repetition rates, compact in size, simple in contruction and inexpensive.

Briefly stated the pressure-wave cycled, repetitively pulsed laser constituting the invention utilizes the thermal pulse of the laser to force the gas to circulate by channeling the rarefaction wave through a chamber having a constantly decreasing cross-sectional area throughout its length, thereby eliminating the need for moving parts including electronically driven parts.

Other objects and features of the invention will become more readily apparent from the following detailed description when read in conjunction with the accompanying drawings, in which.

Figure 1:
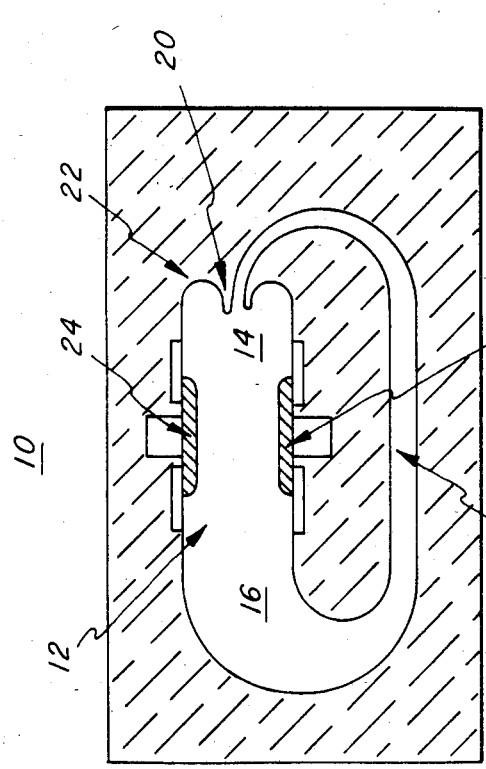
FIG. 1 is a cross-sectional view of a first embodiment of the invention.

Referring now to FIG. 1, the gas laser 10, which may be, for example, a carbon dioxide ($CO_2$) laser containing heliun,(HE) and nitrogen,(N/2), comprises a discharge region (cavity) 12 having an upstream side 14 and a downstream side 16. The downstream side 16 is the entrance to a conicoidical chamber or channel 18. That is, channel 18 includes the downstream side 16 as an entrance, a downwardly tapered body portion and an exit formed by the upstream side 14 of the laser cavity 12. In this manner the channel 18 together with the laser cavity forms a loop preferably, with the exit of the channel being positioned in such a way as to direct exiting gas across the surface of a cathode 25. Although not essential, preferably an entrainment surface 20 is formed as part of a flange member contiguous with the upstream side 14 and a reflector surface 22 is contiguous with the entrainment surface to complete the flange member. The reflector surface is attached to the upstream side of the laser cavity 12. The laser cavity 12 includes the electrodes of the laser initiation mechanism, an anode 24 and the cathode 25.

In operation, the unit 10 operates by utilizng the instantaneous pneumatic pressure pulse created between the electrodes 24 each time the laser is discharged.

The pressure pulse expands uniformly and, after leaving the electrode region 12, enters the conicoidical chamber 18 connecting one side of the discharge region to the other side. The opening into the chamber being larger on one side of the discharge region than on the other side, different quantities of energy, from the pressure pulse, enter the chamber from each end.

Once inside the chamber 18 each pulse, one from each side of the discharge region, begins to travel through the chamber towards the other opening. At some point the two pressure fronts meet with a cancellation of energy approximately equal to the ratio of the areas of the two openings. Subsequent to the cancellation a resultant wavefront continues to move from the larger opening side to the smaller opening. Due to the continuously decreasing size of the chamber, and the laws of conservation of mass, momentum, and energy the pressure ridge is accelerated. When the pulse reaches the smaller opening it is nozzled to high velocities and causes entrainment of surrounding gases. The displacement into the discharge region forces a circulation of the disassociated or ionized gases, primarily across and near the surface of the cathode 25.

Figure 2:
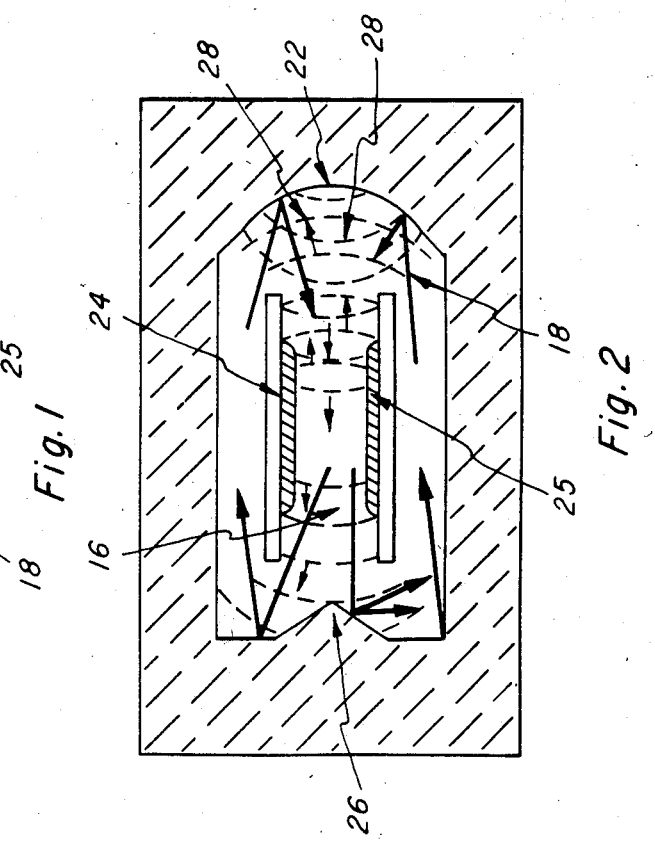
FIG. 2 is a cross-sectional view of a second embodiment of the invention.

Many alterations and variations of this concept are possible, each having various degrees of effectiveness. For example, FIG. 2 shows a cross-section of a lateral pumping arrangement as a second embodiment of the invention. In this embodiment, the reflector 22 causes a circulation action shown in dotted lines. The reflector may be parabolic, hyperbolic or any other shape that reflects and focuses the shockwave back into the discharge region. A shockwave dispersion device 26 having, for example, a convex, or angular shape or formed of a sponge metal is mounted adjacent to the side 16 of the chamber 18 opposite the reflector to prevent the shockwave and associated pressure ridge 28 from being reflected back into the discharge region. Thus by using the structures of FIGS. 1 or 2 the inherent pressure pulse is utilized, through asymmetric reflection, dispersion and/or channeling, to force a pressure differential within the laser 10 whereby the gas is circulated through the unit.

Figure 3:
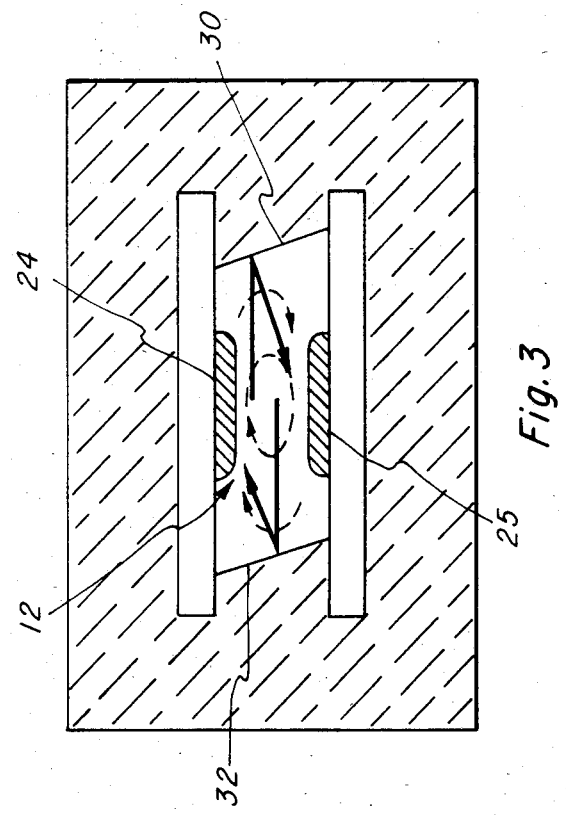
FIG. 3 is a cross-sectional view of a third embodiment of the invention.

In another embodiment (FIG. 3), the loop, which allows the pressure ridge to pass, is replaced with an asymetrical cavity 12 having reflecting sides 30 and 32 which reflect the pressure wave in a circular manner about the center of the discharge region which causes sufficient mixing of the gases from the side gas reservoirs to make possible an increased firing rate.

It will be appreciated by those persons skilled in the art that the invention is applicable to any pulsed laser using a gaseous medium. It is most effective, however, at high pressure, but functions at all ranges of pressures, and is particularly useful in high repetitive rate discharge lasers and others which require a flow past a catalyst. Such lasers are required in laser rangefinding and radar systems.

Although several embodiments of this invention have been described, it will be apparent to a person skilled in the art that various modifications to the details of construction shown and described may be made without departing from the scope of the invention.

What is claimed is:

1. A gas laser comprising a laser cavity, a lasing discharge gas in the laser cavity, lasing initiation means for producing a shock wave and an inherent pressure pulse resulting from said shock wave, and pneumatic circulating means using the shock wave and the inherent pressure pulse to circulate the lasing gas through the laser between discharge pulses such that removal of disassociated or ionized or both species of gas from the discharge region is achieved prior to the next discharge of the laser.

2. A gas laser according to claim 1 wherein the laser cavity includes first and second open sides and the circulating means includes a channel means having a first end formed by the first open side of the laser cavity, a body portion and a second flanged end including the second open side of the laser cavity, an entrainment surface and a reflector surface, said body portion having a constantly decreasing cross-sectional area tapered throughout its length from the first end to the second end of the channel whereby waves of the inherent pressure pulse entering the first and second ends of the channel means meet with a cancellation of energy substantially equal to a ratio of the two openings, and the resultant wavefront is accelerated from the larger end to the smaller end where it is nozzled to high velocities thereby causing entrainment of surrounding gases and circulation of the gases.

3. A gas laser according to claim 1 wherein the laser cavity comprises asymetrical reflecting sides for reflecting the pressure wave in a circular manner for producing circulation and mixing of the gases thereby allowing an incresed laser firing rate.

4. A gas laser according to claim 1 wherein the laser cavity includes an upstream side and downstream side and the circulating means includes a channel means having a reflector adjacent the upstream side and a gas dispersion means adjacent the downstream side whereby the inherent shock wave is reflected back through the laser cavity to the shock wave dispersion means for dispersion through the channel means thereby preventing shock waves from being reflected back into the laser cavity and inhibiting circulation of the gases through the laser cavity and channel to the upstream side of the laser cavity.

5. A gas laser according to claim 4 wherein the channel means includes a channel circumscribing the laser cavity and the dispersion means has shape for dispersing the gas through the channel.

6. A gas laser according to claim 5 wherein the dispersion means has a convex shape.

7. A gas laser according to claim 5 wherein the dispersion means has a angular shape.

8. A gas laser according to claim 4 wherein the dispersion means is a sponge metal member.

9. A gas laser according to claim 2 wherein said pneumatic circulating means circulates said lasing gas such that disassociated species of said lasing gas resulting from the laser discharge are recombined.

* * * * *